United States Patent [19]

Flair

[11] 3,862,721

[45] Jan. 28, 1975

[54] MATERIAL GRINDING MECHANISM

[75] Inventor: Henry Joseph Flair, Franklin Park, Ill.

[73] Assignee: Illinois Tool Works Inc., Chicago, Ill.

[22] Filed: Feb. 7, 1973

[21] Appl. No.: 330,429

[52] U.S. Cl. ............................. 241/236, 241/293
[51] Int. Cl. ............................................. B02c 4/08
[58] Field of Search ...... 83/342, 345; 241/227, 236, 241/293

[56] References Cited
UNITED STATES PATENTS

| | | | |
|---|---|---|---|
| 1,910,852 | 5/1933 | Mosshart | 241/227 X |
| 3,425,640 | 2/1969 | Kletschke et al. | 241/236 |
| 3,529,777 | 9/1970 | Dodson et al. | 241/236 X |
| 3,548,742 | 12/1970 | Seufert et al. | 241/236 X |
| 3,633,831 | 1/1972 | Dodson et al. | 83/345 X |

*Primary Examiner*—Roy Lake
*Assistant Examiner*—Howard N. Goldberg
*Attorney, Agent, or Firm*—Olson, Trexler, Wolter, Bushnell & Fosse, Ltd.

[57] ABSTRACT

The present invention contemplates the provision of novel and very practical means and methods for feeding and comminuting or granulating work material. For the purpose of illustrating a practical adaptation of the invention, the present application discloses a novel arrangement of generally cylindrical rotary members, the peripheries of which incorporate a novel disposition of herringbone-shaped meshing teeth. When work material is directed between the aforesaid meshing peripheries or teeth, said work material is not only influenced to move tangentially of said peripheries, but also to be continuously urged axially toward meshing tooth apices positioned intermediate the opposite extremities of their respective rotary members. In other words, comminuted or granulated work particles are continuously forced axially in opposite directions toward the meshing apices.

9 Claims, 11 Drawing Figures

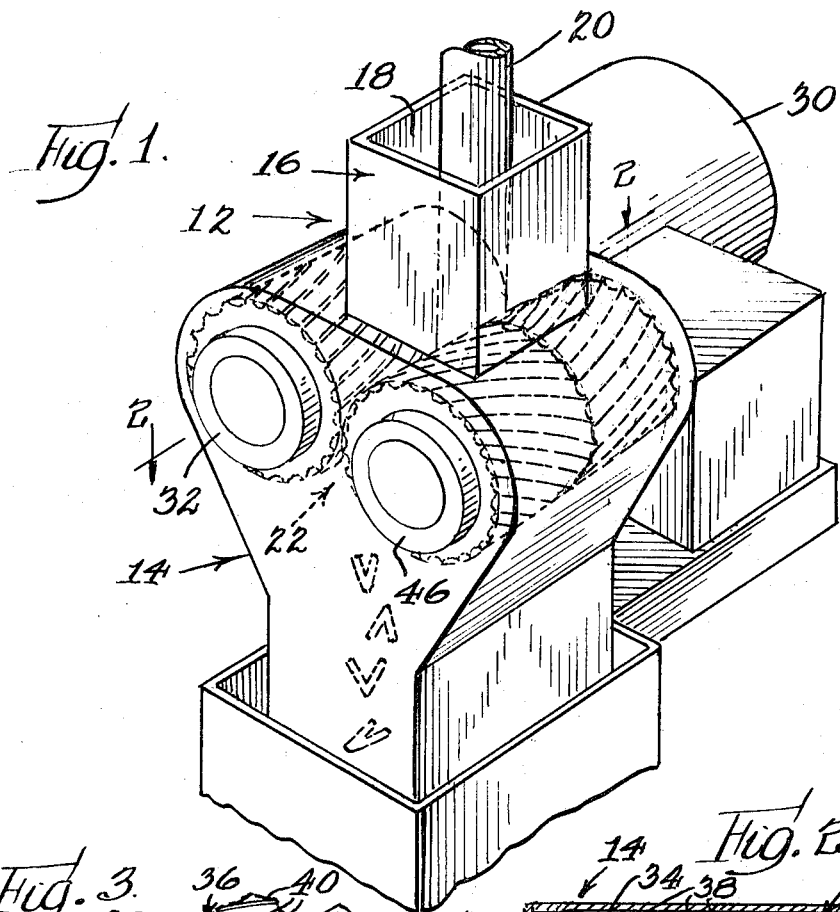
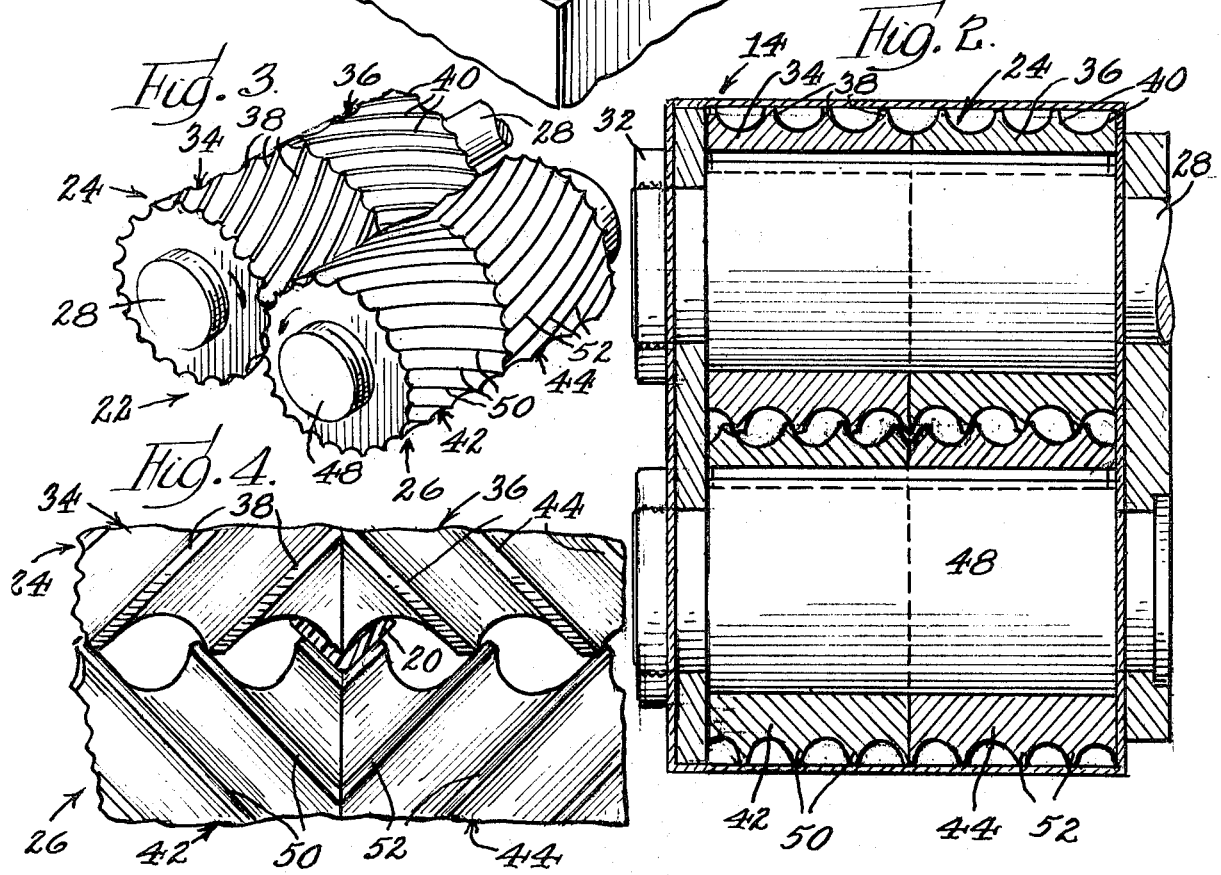

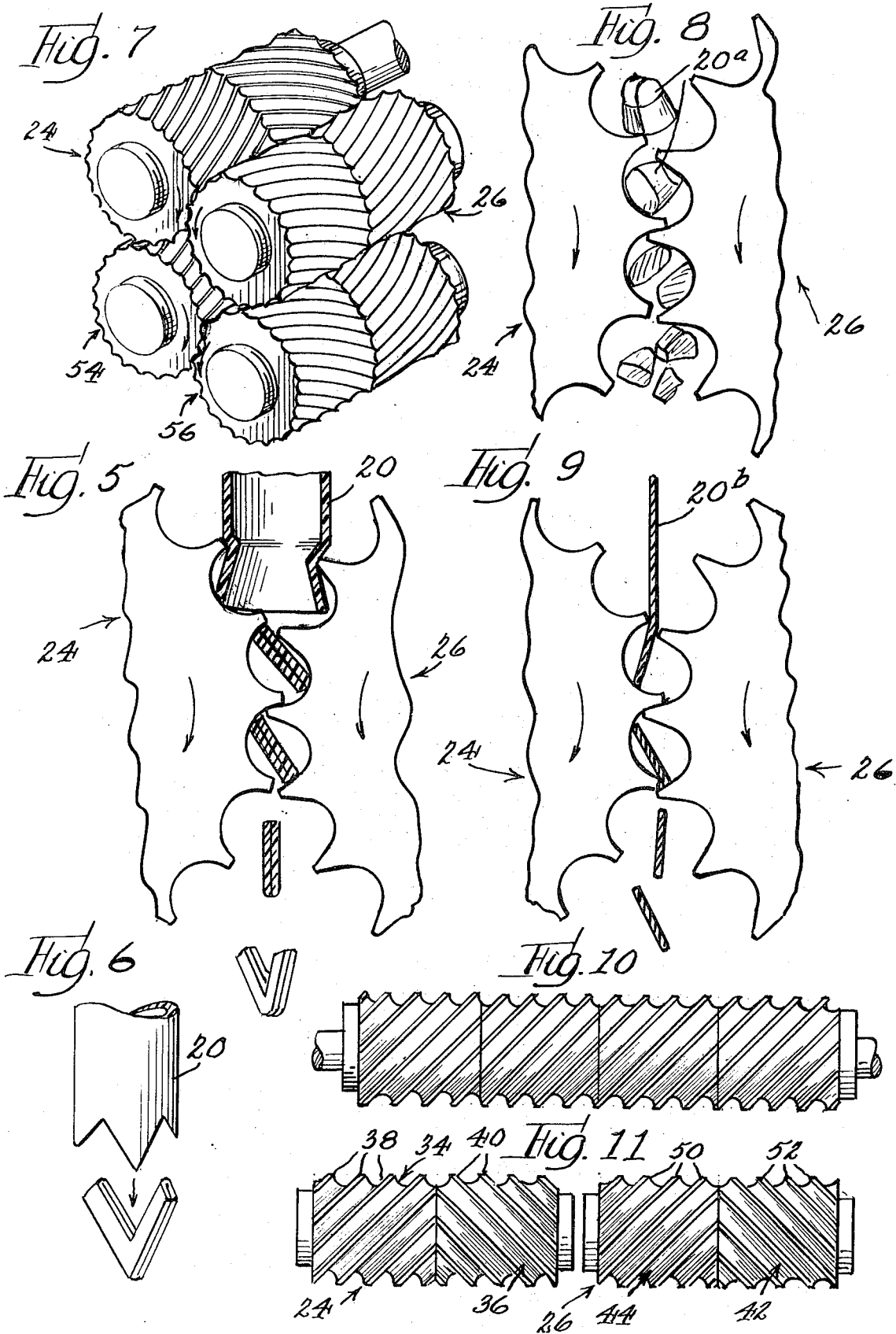

MATERIAL GRINDING MECHANISM

SUMMARY OF THE INVENTION

The present invention is particularly concerned with but not limited to the problem of feeding and comminuting granulating an extended length of work material in the form of conduit, strip stock, web and the like. One of the difficulties experienced by users of methods and apparatus heretofore available has been the tendency of coacting rotatable elements of such apparatus to become clogged or "choked up." This has been particularly true in instances where elongate plastic work material has been acted upon. The present invention contemplates the provision of improved methods and apparatus whereby the above-mentioned and other difficulties are obviated. Thus the present invention envisions novel methods and apparatus whereby work material, as for example extended lengths of plastic conduit and the like may be uninterrutedly moved through a feeding and comminuting station free from any encumbrance.

In the manufacture of plastic conduits, the initially extruded section of conduit material is often imperfectly formed and must therefore ultimately be severed from the properly formed conduit material which follows. It has heretofore been customary for the imperfectly formed severed section to be cut into reduced lengths, and these shortened lengths are then delivered to a station where they are further reduced to a size which facilitates mixing thereof with additional material for re-use. It is an object of the present invention to provide improved methods and apparatus whereby the cutting of imperfect formed stock into reduced lengths is eliminated and the uninterrupted advancement and comminution of work material is assured.

It is a further object of the present invention to provide novel methods and apparatus for granulating or comminuting a wide spectrum of materials such as agricultural products, forest products, materials employed in metal fabricating, etc.

The present invention further contemplates the use of a unique arrangement of comminuting or granulating rotary elements equipped with meshing, herringbone-shaped teeth adapted to urge work material directed to the bite thereof axially in opposite diretions toward the center of said rotary elements, namely, toward the meshing apices of said teeth.

BRIEF DESCRIPTION OF THE DRAWINGS

The foregoing and other objects and advantages will be more apparent from the following detailed description, when considered in connection with the accompanying drawings, wherein:

FIG. 1 is a perspective view of work comminuting or granulating apparatus of the type contemplated by the present invention:

FIG. 2 is a horizontal sectional view of the work comminuting rotary elements, said view being taken substantially along the line 2—2 of FIG. 1;

FIG. 3 is a perspective view disclosing the work comminuting rollers detached from the apparatus illustrated in FIG. 1;

FIG. 4 is a fragmentary plan view of the cooperating rotary elements of FIGS. 1–3 inclusive, more clearly to illustrate the manner in which the meshing apices of said rotary elements act upon work material directed thereto;

FIG. 5 is a fragmentary vertical sectional view to illustrate the manner in which the herringbone-shaped teeth of the coacting rotary elements function to form chevron-like particles from plastic conduit material;

FIG. 6 is a fragmentary perspective view to illustrate the shape of the entering extremity of the tubular workpiece after a chevron-shaped particle has been formed and separated from the tube;

FIG. 7 illustrates a modified arrangement of work comminuting or granulating rotary elements;

FIG. 8 is a fragmentary sectional view similar to FIG. 5, illustrating the manner in which agricultural products such as corn may be reduced in size to relatively small particles;

FIG. 9 is a view similar to FIGS. 5 and 8, illustrating the manner in which a web or strip of work material may be severed into small particles;

FIG. 10 illustrates the manner in which peripheral helical teeth may be produced contemporaneously in a plurality of cutter bodies positioned in abutting relation upon a spindle, said individual cutters separated subsequently and clamped end for end with other similarly produced cutters in order to produce pairs of rotary elements having peripheral herringbone-shaped teeth arranged as shown in FIGS. 3 and 7; and FIG. 11 illustrates the manner in which the rotary work comminuting elements or cutters produced in the manner illustrated in FIG. 10 may be clamped in end for end abutting relation to present herringbone-shaped teeth of the type contemplated by the present invention.

DESCRIPTION OF THE PREFERRED EEMBODIMENTS

Referrng now to the drawings more in detail, wherein like numerals have been employed to designate similar parts throughout the various views, it will be seen that apparatus which is illustrative of one embodiment of the invention is designated generally by the numeral 12. The mechanism 12 includes a housing 14 and a work material accommodating section 16 extending upwardly from said housing provided an opening 18 for receiving work material such as a plastic tube or conduit 20 shown in FIG. 1. Rotatably supported within the housing 14 is a unit designated generally by the numeral 22, which comprises a pair of generally cylindrical work material comminuting rotary devices, one of said devices being designated by the numeral 24 and the other by the numeral 26.

The rotary device or element 24 is keyed to and driven by a shaft 28 which is suitably coupled with an electric motor 30. The outer extremity of the shaft 28 is threaded as shown in FIG. 3, to accommodate a complementary clamping or fastening nut 32. The device 24 is comprised of sections 34 and 36 clamped together in abutting relation through the agency of the above-mentioned nutt 32. The sections 34 and 36 of the rotary element 24 are provided with helical teeth 38 and 40 of opposite hand, which in the aggregate present a plurality of circumferentially distributed peripheral teeth of generally herringbone-shape as clearly shown in FIGS. 3 and 4.

The cylindrical rotary work comminuting device or member 26 like the previously described complementary rotary element 24 comprises a section 42 clamped in abutting relation with a section 44 through the agency of a nut 46, mounted upon the projecting threaded exremity of a spindle or shaft 48, which is freely rotatable within the housing. The sections 42 and 44 of the rotary element 26 are keyed to the spindle 48 as clearly shown in FIG. 2. As the elements or devices 24 and 26 rotate in the direction indicated by the arrows in FIG. 3, the herringbone-shaped teeth mesh, as shown in FIGS. 2 and 4. The driving device 24 serves to impart rotation to the device 26. Thus the rotatable members or devices 24 and 26 when viewed from the work receiving side thereof, namely from the top, FIGS. 1 and 3, present the aforesaid coacting herringbone-shaped teeth between which work material 20 is directed.

Particular attention is directed to the fact that the included angles of the apices of one rotatable member face and open toward the corresponding included angles of the apices of the rotatable member as the periphery of one member moves toward the periphery of the other; see FIG. 4. The herringbone teeth partially mesh so as to exert a shearing or scissors-like action upon the workpiece directed therebetween. It is important to note that as a result of the abovementioned helical disposition of the teeth 38 and 40 of one rotary member and the helical disposition of the teeth 50 and 52 of the other rotary member, work material directed to the bite or meshing area of the herringbone-shaped teeth will be acted upon continuously to urge the sheared work material axially toward the meshing apices of the teeth or, in other words; axially inwardly from the opposite extremities of the work comminuting rotary members 24 and 26.

It will be noted that the herringbone-shaped teeth are relatively thin in the vicinity of their outer peripheries. With the teeth thus shaped and only partially meshing, sufficient space is provided for accommodating the work material between said meshing teeth. Obviously, the size and pitch of the herringbone-shaped teeth may vary in accordance with the work material to be comminuted thereby.

In FIG. 5, the manner in which the herringbone-shaped teeth function to sever the entering extremity of the tubular workpiece 20 into particles of reduced size, is clearly shown. It will be seen that the tubular workpiece or conduit 20 is severed or broken-up relatively small chevron-like particles. In FIG. 6, the effect of the helical shearing teeth upon the advancing extremity of the tubular workpiece 20 is more graphically illustrated. Thus as the work material 20 is advanced between the helical teeth, said work material is severed into relatively small particles, which may be mixed with additional plastic material for reuse.

It should be understood that the method and apparatus contemplated by the present invention are adapted for comminuting a wide spectrum of materials. In FIG. 8, for example, kernels of corn 20A are directed to the bite or meshing area of the above-mentioned herringbone-shaped teeth so as to cause said kernels to be broken up into relatively small particles. Likewise in FIG. 9, a web of work material 20B, directed to the bite of the rotary devices 24, and 26, is severed into particles of reduced size. Obviously, the present invention is not limited to the granulation or comminuting of the work materials specifically disclosed herein and contemplates the use of the improved method and apparatus for handling a wide variety of other work material.

From the foregong it should be apparent that regardless of the nature of the work material directed between the cylindrical rotary devices 24 and 26, said work material is constantly urged axially toward the meshing apices of the herringbone-shaped teeth. Any tendency for comminuted or granulated work material to move axially toward the oppoextremities of the comminuting or cutting roller is positively precluded. Hence no clogging or jamming comminuted material within the apparatus is experienced. This assures uninterrupted passage of work material between the coacting rotary cylindrical cutter bodies.

In instances where further reduction in the size of the work particles discharged from the underside of rotary devices 24 and 26 is required, a second set of work comminuting roller devices 54 and 56 may be employed as illustrated in FIG. 7. The cutting roller 54 may be driven from a suitable power source such as the electric motor 30 and the herringbone-shaped teeth of the cutter 54 drivingly mesh with complementary herringbone-shaped teeth of the roller 56. In some instances, it may be desirable to provide helical, herringbone-shaped teeth on the rotary devices 54 and 56 having a finer pitch than the herringbone-shaped teeth of the previously described rotary devices 24 and 26. The use of the finer pitch-teeth serves to increase the reduction in size of the work particles received from the rotary comminuting devices 24 and 26. As previously stated, the size and pitch of the meshing herringbone-shaped teeth of each pair of work-shearing devices will depend upon the nature of the work material to be handled thereby.

To facilitate the production of helical teeth, a group of blanks may be mounted upon a shaft or spindle as shown in FIG. 10. In FIG. 10 a group of four cutter blank sections corresponding with the previously mentioned sections 34 and 44 may be acted upon to produce helical teeth thereon corresponding with the teeth 38 and 50, respectively. Likewise, a gang of cutter blanks may be mounted as shown in FIG. 10 so as to enable the formation thereon of helical teeth of opposite hand corresponding with the teeth 40 of section 36 and the teeth 52 of this section 42. These sections may then be arranged in abutting relation as shown in FIG. 11 so as to present a pair of rotary cutter devices. Obviously, when these rotary cutter devices are mounted in position within the housing 14 included angles of the herringbone teeth of one rotary cutter will face the included angles of the other cutter as clearly illustrated in FIG. 4.

From the foregoing it will be apparent that the present invention contemplates a distinct improvement in advancing and comminuting work material of a wide variety. Due to the novel arrangement of the above-described herringbone teeth, work material which has been acted upon is urged constantly and axially in a direction toward the center or meshing apices of the comminuting rotary devices. The present invention also assures the comminuting or granulating of work material without the possibility of said work material becoming wrapped around the rotary cutters. Also, by following the teachings of the present invention, work material may be comminuted uninterruptedly at increased speeds and with a minimum of noise resulting from machine operation.

While the present application discloses certain practical embodiment of the present invention, it should be understood that modifications and changes are contemplated and that said invention should be limited only by the spirit and scope of the appended claims.

The invention is claimed as follows:

1. Material handling mechanism including a pair of complementary generally cylindrical and peripherally contacting members rotatable about laterally spaced axes in a direction to advance work material directed therebetween, said rotatable members presenting a plurality of partially meshing circumferentially distributed peripheral teeth of generally herringbone shaped and defining a work material entering throat providing clearance to accommodate work material, the peripheries of said rotatable members, when viewed from the work-receiving side thereof, defining the aforesaid herringbone-shaped teeth in which the apices thereof are located intermediate the opposite ends of their respective rotatable member, the included angles of the apices of one rotatable member facing and opening toward the corresponding included angles of the apices of the other rotatable member as the periphery of one member moves toward the periphery of the other member with said apices being pointed in the direction said work-receiving side and away from the entering throat so that the axially opposite extremities of the herringbone-shaped teeth of one of said members initially and successively engage the corresponding opposite extremities of the complementary teeth of the other member with the consequent continued working engagement of said teeth acting from opposite sides of and toward said apices whereby to assure continued accumulation of work material in the vicinity of said successively meshing apices.

2. Material handling mechanism as set forth in claim 1 wherein the herrringbone-shaped teeth of one of said rotatable members are adapted to make shearing contact with with complementary teeth of the other rotatable member, whereby to cause work material acted upon by said teeth to be urged axially inwardly from the opposite extremities of said rotatable members.

3. Material handling mechanism as set forth in claim 1 wherein the herringbone-shaped teeth of one of said rotatable members drivingly engages the complementary herringbone teeth of the other rotatable member, and wherein means is provided for imparting rotation to said first-mentioned member.

4. Material handling mechanism as set forth in claim 1 wherein a second pair of complementary generally cylindrical and peripherally contacting members are rotatable about laterally spaced axes and present a plurality of partially meshing circumferentially distributed peripheral teeth generally herringbone shape providing clearance to accommodate work material acted upon by said first-mentioned pair of rotatable members whereby to cause further reduction in the size of the work particles, the teeth of said second pair of rotatable members presenting apices disposed similarly to the apices of the teeth of said first rotatable member whereby to assure axial shifting of work particles toward the apices of said second pair of rotatable members.

5. Material handling mechanism as set forth in claim 4 wherein the meshing teeth of said second pair of rotary members has a finer pitch than the pitch of the teeth of said first-mentioned pair of rotatable members.

6. Material handling mechanism as set forth in claim 1, wherein a housing is provided for said rotatable contacting members, said housing having an upper opening for receiving work material to be acted upon by the herringbone shaped teeth of said rotatable members.

7. Material handling mechanism as set forth in claim 1, wherein each of said rotatable elements comprises sections having helical teeth of opposite hand secured together in end to end relation, whereby in the aggregate to present a plurality of circumferentially disposed teeth of herringbone shape.

8. Material handling mechanism as set forth in claim 7, wherein means is provided for clamping said sections in end to end relation so as to present a unitary rotatable element having said herringbone shaped teeth.

9. Material handling mechanism as set forth in claim 7, wherein said sections are supported by and keyed to rotatable spindles, the axes of which are disposed in parallelism with each other.

* * * * *